US006996406B2

(12) United States Patent
Lection et al.

(10) Patent No.: US 6,996,406 B2
(45) Date of Patent: Feb. 7, 2006

(54) GLOBAL POSITIONING FAMILY RADIO SERVICE AND APPARATUS

(75) Inventors: David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/938,933

(22) Filed: Aug. 24, 2001

(65) Prior Publication Data

US 2003/0040322 A1 Feb. 27, 2003

(51) Int. Cl.
*H04Q 7/20* (2006.01)
(52) U.S. Cl. ............... 455/457; 342/450; 701/213
(58) Field of Classification Search ............ 455/456.1, 455/456.3, 456.6, 457, 414.1, 426.1, 556.1, 455/566
See application file for complete search history.

(56) References Cited

U.S. PATENT DOCUMENTS

| | | | |
|---|---|---|---|
| 5,263,195 A * | 11/1993 | Panther et al. ............... 455/316 |
| 5,422,816 A * | 6/1995 | Sprague et al. ............ 455/556.2 |
| 5,677,837 A * | 10/1997 | Reynolds .................. 455/456.3 |
| 5,960,337 A | 9/1999 | Brewster et al. |
| 6,028,514 A | 2/2000 | Lemelson et al. |
| 6,041,243 A | 3/2000 | Davidson et al. |
| 6,169,497 B1 | 1/2001 | Robert |
| 6,204,808 B1 | 3/2001 | Bloebaum et al. |
| 6,373,430 B1 * | 4/2002 | Beason et al. ......... 342/357.09 |
| 6,477,363 B1 * | 11/2002 | Ayoub et al. ............. 455/404.2 |
| 6,771,969 B1 * | 8/2004 | Chinoy et al. ............ 455/456.1 |
| 2001/0018635 A1 * | 8/2001 | Miyasaka et al. ........... 701/200 |

OTHER PUBLICATIONS

R. Klukas, et al., *Development of a CellularTelephone Positioning System Using GPS Time Synchronization and a Super-Resolution Algorithm*, (1998) <http://www.ensu.ucalgary.ca/GPSRes/Klukas.html.
Motorola Online Business, *Introduction to 2-Way Radios*, <http://www.myradiomall.com/arsradio/course_1.htm.

* cited by examiner

Primary Examiner—Fan Tsang
Assistant Examiner—Simon Sing
(74) Attorney, Agent, or Firm—Stephen A. Calogero, Esq.; Steven M. Greenberg, Esq.; Christopher & Weisberg, P.A.

(57) ABSTRACT

A personal radio service (PRS) device configured to engage in private, short-range two-way voice communications with another PRS device in range of the PRS device. The PRS device can include a GPS receiver disposed in the PRS device; and, a radio frequency (RF) transceiver. The RF transceiver can be configured both to modulate and transmit voice communications and positioning data received from the GPS receiver, and also to demodulate voice communications and positioning data received from other PRS devices in range of the PRS device. The PRS device can include any private, short-range, two-way communications device, for example a Citizens Band (CB) radio services device, a General Mobile Radio Services (GMRS) device, and a Family Radio Services (FRS) device, each configured to engage in private, short-range two-way voice communications with another corresponding device in range thereof.

5 Claims, 3 Drawing Sheets

GLOBAL POSITIONING FAMILY RADIO SERVICE AND APPARATUS

BACKGROUND OF THE INVENTION

1. Statement of the Technical Field

The present invention relates to private Personal Radio Services (PRS) for short distance two-way voice communications and more particularly to a location-based PRS device and apparatus.

2. Description of the Related Art

Personal Radio Services (PRS) include those short-distance two-way radio frequency voice communications services which can be used by individuals to communicate with others while in close proximity to one another. Historically, PRS included the Citizens Band (CB) Radio Service and the General Mobile Radio Service (GMRS). While both are regulated by the Federal Communications Commission (FCC), only the use of GMRS requires an operator license. With the CB Radio Service, users can expect a communications range of one to five miles. By comparison, with the GMRS, users can expect a range of five to twenty-five miles.

Recently, the FCC has authorized the use of the Family Radio Service (FRS). The FRS is a citizens band radio service which includes fourteen channels which can be used by individuals on a "take turns" basis. No FRS channel is assigned to any specific individual or organization. Rather, FRS is intended for use by civilians who can communicate among themselves within neighborhoods and while on group outings. Additionally, while it is not permissible to link an FRS device to the public switched telephone network, civilians may use an FRS device to conduct business-related communications. Presently, the FCC regulates the use of the frequency spectrum allocated to FRS devices and has published four rules pertaining to the operation of FRS devices in the United States Code of Federal Regulations, Title 47, Telecommunications, Part 80 to End.

Unlike FRS, Global Positioning System (GPS) devices have been publically available for nearly a decade. In fact, though GPS initially had been designed for and operated by the U.S. military, today there are many thousands of civilian users of GPS worldwide. In operation, GPS provides specially coded satellite signals that can be processed in a GPS receiver, enabling the receiver to compute position, velocity and time. Four GPS satellite signals are used to compute positions in three dimensions and the time offset in the receiver clock. GPS devices first became popular during the Persian Gulf War, as they were used extensively by servicemen to find their location.

Since the late 1990s, cellular phone manufacturers have incorporated location based services into long-range radio frequency communications devices such as cellular telephones. In particular, the combination of GPS and cellular services has ben viewed in the vehicle security industry as a sensible combination in view of the worldwide range of a cellular telephone and the corresponding uncertainty of one's absolute geographic position at any one time. Exemplary uses of a combined cellular telephone/GPS system include the ubiquitous OnStar® system deployed in automobiles by automobile manufacturers such as General Motors and Ford Motor Company.

Unlike the combination of cellular telephone and GPS technologies, a similar combination of short-range radio communications and GPS technologies heretofore has not been developed because the limited physical range of a short-range radio communications system has not resulted in the same difficulties of locating one's absolute geographic position. Rather, typically users of short-range communications systems are aware of their general geographic position, particularly given the purpose of the FRS—to enable communications between individuals in a neighborhood or at a group outing. Furthermore, given the typical market for short-range communications systems by comparison to the more expensive GPS systems, it has not been economically feasible to combine both systems.

Nevertheless, it would be desirable to be able to ascertain one's position relative to a companion party in a private, short distance two-way voice communications session. Importantly, it is not usually realistic to reference the location of a companion party in a private, long range two-way communications session such as a cellular telephone call inasmuch as the range of the cellular telephone at an extreme permits intercontinental conversations. In contrast, in short-range voice communications systems, conversing parties typically must be within short range of one another, at most a few miles. Hence, it would be useful to be able to ascertain the location of a companion party to a private, two-way voice communications session.

SUMMARY OF THE INVENTION

The present invention addresses the deficiencies of the prior art by providing a system and method able to ascertain the location of a companion party to a private, two-way voice communications session. Specifically, the present invention is a personal radio services (PRS) apparatus uniquely combined with a GPS system so as to provide location based data both to the user of the PRS apparatus and to a companion party communicatively linked to the PRS apparatus in a two-way voice communications session.

In one aspect of the invention, a PRS device can be provided which has been configured to engage in private, short-range two-way voice communications with another PRS device in range of the PRS device. The PRS device can include a GPS receiver disposed in the PRS device; and, a radio frequency (RF) transceiver. The RF transceiver can be configured both to modulate and transmit voice communications and positioning data received from the GPS receiver, and also to demodulate voice communications and positioning data received from other PRS devices in range of the PRS device.

The PRS device also can include a positioning information processor for processing positioning data received from said GPS receiver. An encoder/decoder circuit also can be provided which can encode positioning data for transmission by the RF transceiver. Finally, the PRS device can include an identification tone generator for generating identification tones. In that case, the encoder can encode the positioning data in the generated identification tones for transmission by the RF transceiver.

Notably, the PRS apparatus can include both a mapping processor for processing the positioning data relative to an absolute location in a map, and also a visual display for displaying both the map and the processed positioning data overlain on the map. The PRS apparatus also can include a visual display for displaying position information based upon the positioning data. In that case the displayed position information can include a bearing and range of another PRS device with which the PRS device is engaged in private, short-range, two-way voice communications.

The PRS device can include any private, short-range, two-way communications device. One example of a suitable PRS device can include a Citizens Band (CB) radio services device configured to engage in private, short-range two-way voice communications with another CB Radio Services device in range of the CB Radio Services device. Another example of a suitable PRS device can include a General Mobile Radio Services (GMRS) device configured to engage in private, short-range two-way voice communications with another GMRS device in range of the GMRS device. Yet another example of a suitable PRS device can include a Family Radio Services (FRS) device configured to engage in private, short-range two-way voice communications with another FRS device in range of the FRS device.

The present invention also can include a PRS communications method. A PRS communications method in accordance with the inventive arrangements can include the steps of establishing a private, two-way, short-range voice communications link with another PRS device, establishing a data link with a positioning data transmitter and receiving positioning data from the positioning data transmitter. The positioning data can be processed to determine location-based information associated with the PRS device. Once processed, the location-based information can be displayed in the PRS device. Importantly, the positioning data can be encoded using a privacy code prior to transmission. In particular, the privacy code can restrict access to the positioning data by other PRS devices.

In one aspect of the invention, the method further can include the steps of modulating the positioning data onto a carrier signal which can be transmitted over the private, two-way, short-range voice communications link, and transmitting the modulated positioning data to another PRS device. Conversely, modulated positioning data can be received from another PRS device over the private, two-way short-range voice communications link, and the received modulated positioning data can be demodulated. The demodulated positioning data can be processed to determine further location-based information associated with the another PRS device, and the further location-based information can be displayed in the PRS device.

Importantly, the modulating step can include the steps of encoding the positioning data in an identification tone; modulating the identification tone onto a carrier signal which can be transmitted over the private, two-way, short-range voice communications link; and, transmitting the modulated positioning data to another PRS device. Conversely, the demodulating step can include the steps of: receiving a modulated identification tone in a carrier signal from the another PRS device over the private, two-way short-range voice communications link; demodulating the received modulated identification tone; and, decoding positioning data in the identification tone.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a personal radio service (PRS) device which has been configured with a GPS receiver so that location based information can be shared with another PRS device communicatively linked to the PRS device in a private, two-way voice communications session. Specifically, the location based information can be received from the GPS receiver and modulated into a carrier signal to be transmitted over a private, two-way voice communications link to another PRS device. In one aspect of the present invention, the location based information can be encoded in identification tones which can be transmitted between PRS devices.

Figure 1:
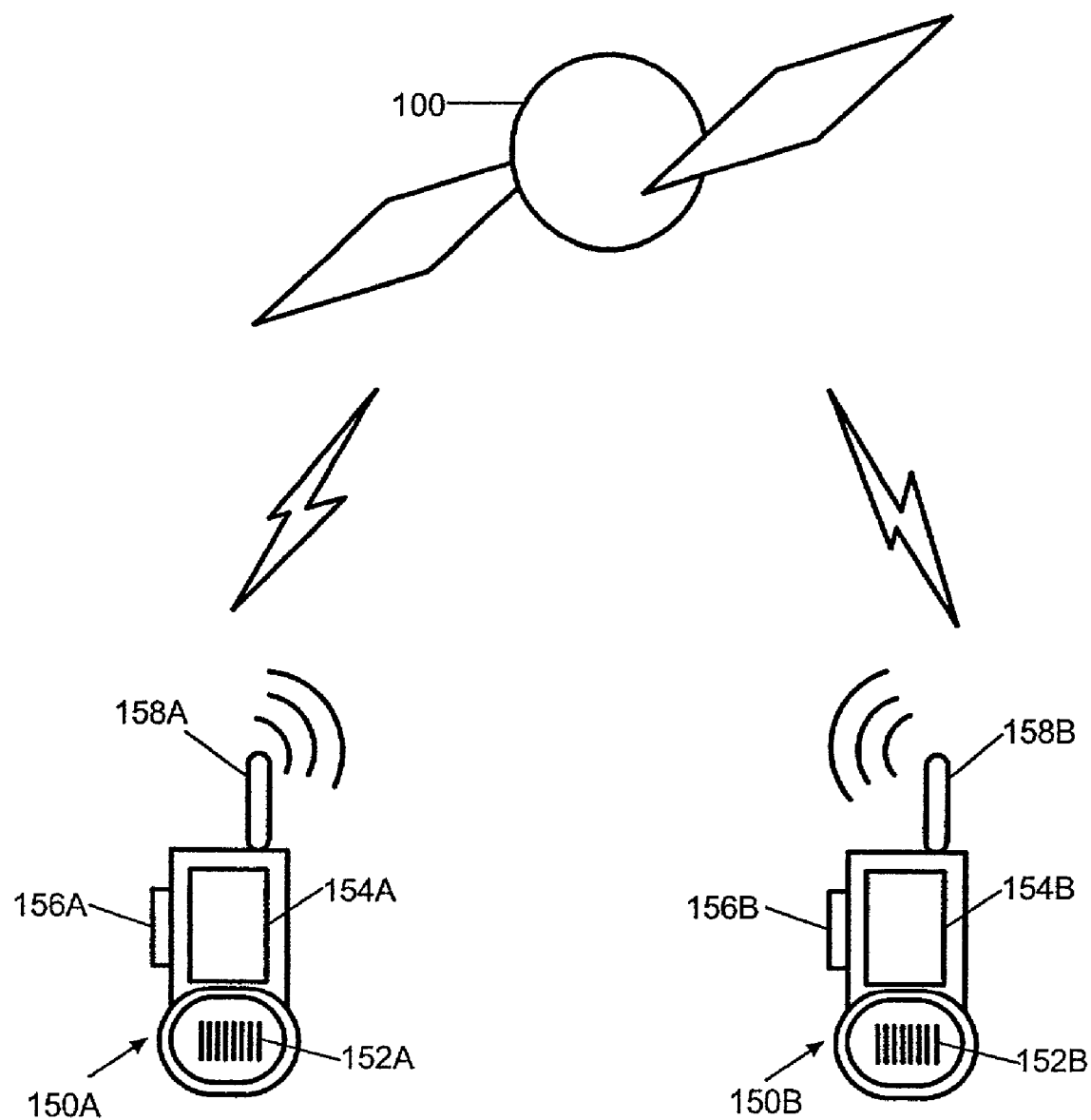
FIG. 1 is a pictorial illustration of two personal radio service (PRS) devices communicatively linked in a private, two-way voice communications session; and, FIG. 2 is a schematic illustration of a PRS device which has been configured in accordance with the inventive arrangements.

FIG. 1 is a pictorial illustration of two personal radio service (PRS) devices 150A, 150B communicatively linked in a private, two-way voice communications session. Each PRS device can include an audio transducer 152A, 152B through which analog speech input can be converted into an electrical waveform to be transmitted via radio frequency (RF) transmitter to another PRS device. An example of such an audio transducer can include a conventional microphone element. Conversely, an audio transducer can be provided (not additionally shown) which can convert an electrical waveform into an audible signal. An example of such an audio transducer is a conventional speaker element.

Each PRS device 150A, 150B can include a push-to-talk button, which when depressed can signal the PRS device 150A, 150B to permit the RF transmission of audio speech provided through the audio transducer 152A, 152B. Additionally, as in the case of a conventional wireless communications device, the PRS device 150A, 150B can include one or more antennae 158A, 158B which can be used not only to transmit and receive RF transmissions to and from the PRS device 150A, 150B, but also the antennae 158A, 158B can be used to receive GPS positioning data transmissions from a constellation of GPS satellites 100. Finally, the PRS device 150A, 150B can include a visual display 154A, 154B through which positioning data can be presented to an end-user.

In accordance with the inventive arrangements, each PRS device 150A, 150B can receive positioning data from the GPS satellite constellation 100. In particular, in one aspect of the invention the PRS device 150A, 150B can receive the GPS positioning data continuously. The invention is not limited in this regard, however, and in an alternative aspect of the invention, the GPS positioning data can be received from the satellite constellation 100 only during those times when the PRS device 150A, 150B is engaged in a private, two-way voice communications session with another PRS device.

In any case, the GPS positioning data can be received and processed in each PRS device 150A, 150B. In one aspect of the invention, the GPS positioning data, either raw or interpreted, can be displayed in the visual display 154A, 154B. More importantly, however, the GPS positioning data can be transmitted to another PRS device so that other PRS devices can ascertain the position of the transmitting PRS device 150A, 150B. In one aspect of the invention, a graphical representation of the GPS positioning data can be presented in the visual display 156A, 156B which explicitly includes a visual representation of the position of another PRS device with which the PRS device 150A, 150B is communicating. For instance, the position of the another PRS device can be overlain on a map.

Notably, though the invention contemplates the use of two or more PRS devices 150A, 150B as substantially described herein in a two-way voice communications session, the invention is not so limited and the PRS devices 150A, 150B equally can communicate with other PRS devices which have not been configured in accordance with the inventive arrangements. In particular, as positioning data can be transmitted via low frequency tones, a PRS device 150A, 150B which has been configured accordingly still can communicate with a PRS device which has not been equipped in accordance with the present invention.

Figure 2:
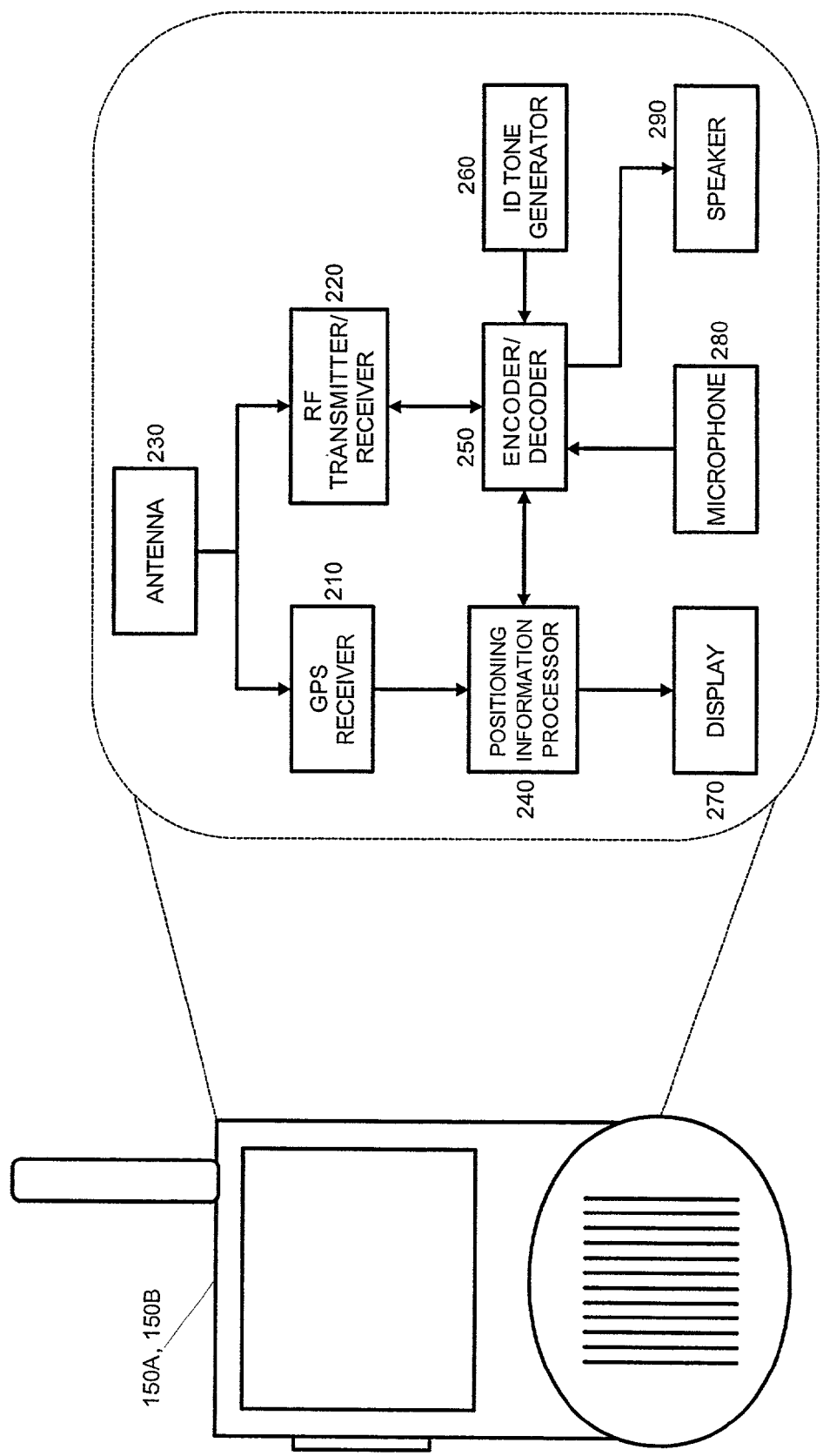

FIG. 2 is a schematic illustration of a PRS device 150A, 150B which has been configured in accordance with the inventive arrangements. As shown in FIG. 2, the PRS device 150A, 150B can include componentry typically found in a conventional wireless RF communications device. Such componentry can include an antenna 230, an RF transmitter/receiver 220, a microphone 280 and a speaker 290. In the present invention, the PRS device 150A, 150B also can include an identification tone generator 260 for generating identification tones, and an encoder/decoder for encoding the identification tones into a signal which can be RF transmitted to recipient PRS devices.

Importantly, the PRS device 150A, 150B shown in FIG. 2 also can include a GPS receiver 210, a positioning information processor 240 and a display 270. The GPS receiver 210 can receive positioning data from a constellation of GPS satellites (typically four satellites). The GPS positioning data which has been received can be processed in the positioning information processor 240. Specifically, the positioning information processor can determine from the raw GPS positioning data the present position of the PRS device 150A, 150B. The positioning information processor 240 further can determine additional positioning data based upon the raw GPS positioning data, for example the range and bearing of another PRS device relative to the PRS device 150A, 150B. Finally, the positioning data can be displayed in the visual display 270.

Aside from processing positioning data received through the GPS receiver 210, the PRS device 150A, 150B also can process positioning data received through a GPS receiver of another PRS device with which the PRS device 150A, 150B is engaged in a private, two-way voice communications session. In particular, the encoder/decoder 250 can extract from a received RF signal positioning data embedded therein. The encoder/decoder 250 can pass the decoded positioning data to the positioning information processor 240 to be processed in a similar manner to that of the positioning data received by the GPS receiver 210.

Conversely, GPS positioning data received in the GPS receiver 210 can be encoded into a signal suitable for transmission to another PRS device with which the PRS device 150A, 150B is engaged in a private, two-way voice communications session. In one aspect of the invention, the positioning data can be encoded in the identification tones generated by the identification tone generator 260. In this way, two communicating PRS devices can ascertain the position of the other, including range and bearing where desired.

In a second, particular aspect of the present invention, privacy codes can be utilized to control the transmission of positioning data to other PRS devices 150A, 150B. Specifically, as is well known in the art, privacy codes can be used to limit the ability of PRS devices to engage in a two-way voice communications session. For example, some PRS devices use privacy codes to de-scramble scrambled voice communications. In any case, in the second, particular aspect of the present invention, privacy codes can be used to restrict access to positioning data transmitted between communicating PRS devices.

Figure 3:
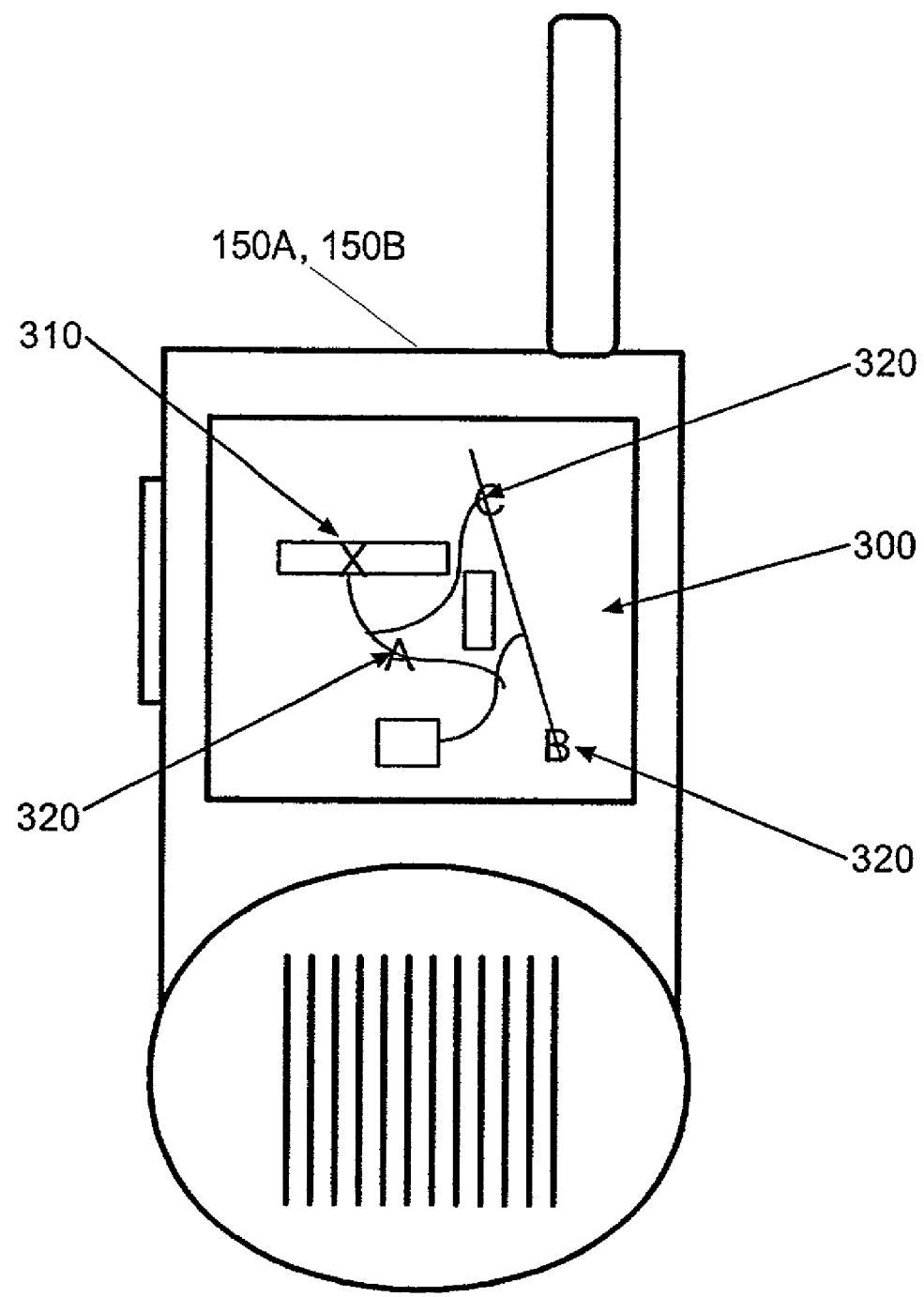
FIG. 3 is a schematic illustration a visual display of positioning data in the display of the PRS device of FIG. 2.

FIG. 3 is a schematic illustration of the PRS device 150A, 150B of FIG. 2 which particularly depicts the visual display of positioning data in the display 270 of the PRS device 150A, 150B. In particular, first the PRS device 150A, 150B can determine an absolute geographic position for the PRS device 150A, 150B. Once determined, the absolute geographic position can be associated with a particular position on a map 300. The map 300 can be displayed in display 270 and the associated position 310 can be displayed thereon. As positioning data is decoded from received radio transmissions from companion PRS devices, the received positioning data can be associated with a particular position on the map 300. Subsequently, the decoded positioning data 320 can be displayed on the map. Notably, as shown in FIG. 3, decoded positioning data 320 for each PRS device in communications with the PRS device 150A, 150B can have a separate indicator, for instance the letters "A", "B", "C", and so on. In consequence, during a PRS radio communications session, each participant in the conversation can ascertain the location of other participants to the conversation.

The present invention can be realized in hardware, software, or a combination of hardware and software. Computer software which can be included as part of the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose embedded computer system with a computer program that, when being loaded and executed, controls the computer system such that it carries out the methods described herein. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

We claim:

1. A personal radio service (PRS) device configured to engage in private, short-range two-way voice communications with other PRS devices in range of the PRS device, the PRS device comprising:
   a GPS receiver disposed in the PRS device;
   a radio frequency (RF) transceiver configured both to modulate and transmit voice communications and positioning data received from said GPS receiver, and also to demodulate voice communications and positioning data received from the other PRS devices in range of the PRS device;
   an encoder/decoder circuit for encoding positioning data for transmission by said RF transceiver; and,
   an identification tone generator for generating identification tones, said encoder encoding said positioning data in said generated identification tones for transmission by said RF transceiver.

2. In a Personal Radio Services (PRS) device, a PRS communications the method comprising the steps of:
- establishing a private, two-way, short-range voice communications link with at least one other PRS device;
- establishing a data link with a positioning data transmitter and receiving positioning data from said positioning data transmitter;
- processing said positioning data to determine location-based information associated with the PRS device;
- modulating said positioning data onto a carrier signal which can be transmitted over said private, two-way, short-range voice communications link, and transmitting said modulated positioning data to said another PRS device, said modulating step comprising the steps of encoding said positioning data in an identification tone; modulating said identification tone onto a carrier signal which can be transmitted over said private, two-way, short-range voice communications link; and, transmitting said modulated positioning data to said another PRS device;
- receiving modulated positioning data from said at least one other PRS device over said private, two-way short-range voice communications link, and demodulating said received modulated positioning data;
- processing said demodulated positioning to determine further location-based information associated with said at least one other PRS device; and,
- displaying said location-based information and said further location-based information in the PRS device,
- whereby said displaying of said location-based information and said further location-based information can indicate a relative position of each PRS device participating in said two-way short-range voice communications link.

3. In a Personal Radio Services (PRS) device, a PRS communications the method comprising the steps of:
- establishing a private, two-way, short-range voice communications link with at least one other PRS device;
- establishing a data link with a positioning data transmitter and receiving positioning data from said positioning data transmitter;
- processing said positioning data to determine location-based information associated with the PRS device;
- modulating said positioning data onto a carrier signal which can be transmitted over said private, two-way, short-range voice communications link, and transmitting said modulated positioning data to said another PRS device;
- receiving modulated positioning data from said at least one other PRS device over said private, two-way short-range voice communications link, and demodulating said received modulated positioning data, said demodulating step comprising the steps of receiving a modulated identification tone in a carrier signal from said another PRS device over said private, two-way short-range voice communications link; demodulating said received modulated identification tone; and, decoding positioning data in said identification tone;
- processing said demodulated positioning to determine further location-based information associated with said at least one other PRS device; and,
- displaying said location-based information and said further location-based information in the PRS device,
- whereby said displaying of said location-based information and said further location-based information can indicate a relative position of each PRS device participating in said two-way short-range voice communications link.

4. A machine readable storage having stored thereon a computer program for Personal Radio Services (PRS) communications in a PRS device, the computer program comprising a routine set of instructions which when executed by a machine causes the machine to perform the steps of:
- establishing a private, two-way, short-range voice communications link with at least one other PRS device;
- establishing a data link with a positioning data transmitter and receiving positioning data from said positioning data transmitter;
- processing said positioning data to determine location-based information associated with the PRS device;
- modulating said positioning data onto a carrier signal which can be transmitted over said private, two-way, short-range voice communications link, and transmitting said modulated positioning data to said another PRS device, said modulating step comprising the steps of encoding said positioning data in an identification tone; modulating said identification tone onto a carrier signal which can be transmitted over said private, two-way, short-range voice communications link; and, transmitting said modulated positioning data to said another PRS device;
- receiving modulated positioning data from said at least one other PRS device over said private, two-way short-range voice communications link, and demodulating said received modulated positioning data;
- processing said demodulated positioning to determine further location-based information associated with said at least one other PRS device; and,
- displaying said location-based information and said further location-based information in the PRS device,
- whereby said displaying of said location-based information and said further location-based information can indicate a relative position of each PRS device participating in said two-way short-range voice communications link.

5. A machine readable storage having stored thereon a computer program for Personal Radio Services (PRS) communications in a PRS device, the computer program comprising a routine set of instructions which when executed by a machine causes the machine to perform the steps of:
- establishing a private, two-way, short-range voice communications link with at least one other PRS device;
- establishing a data link with a positioning data transmitter and receiving positioning data from said positioning data transmitter;
- processing said positioning data to determine location-based information associated with the PRS device;
- modulating said positioning data onto a carrier signal which can be transmitted over said private, two-way, short-range voice communications link, and transmitting said modulated positioning data to said another PRS device;
- receiving modulated positioning data from said at least one other PRS device over said private, two-way short-range voice communications link, and demodulating said received modulated positioning data, said demodulating step comprising the steps of receiving a modulated identification tone in a carrier signal from said another PRS device over said private, two-way short-range voice communications link; demodulating said received modulated identification tone; and, decoding positioning data in said identification tone;

processing said demodulated positioning to determine further location-based information associated with said at least one other PRS device; and, displaying said location-based information and said further location-based information in the PRS device, whereby said displaying of said location-based information and said further location-based information can indicate a relative position of each PRS device participating in said two-way short-range voice communications link.

* * * * *